(12) United States Patent
Demirdogen

(10) Patent No.: US 6,571,961 B2
(45) Date of Patent: Jun. 3, 2003

(54) SLIDING ACTION SEAM SEAL AND RETAINER ASSEMBLY FOR A FLUID FILTER

(75) Inventor: A. Caner Demirdogen, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 23 days.

(21) Appl. No.: 09/848,396

(22) Filed: May 3, 2001

(65) Prior Publication Data

US 2002/0162781 A1 Nov. 7, 2002

(51) Int. Cl.[7] .............................................. B01D 27/08
(52) U.S. Cl. ................. 210/443; 210/450; 210/DIG. 17
(58) Field of Search ................................ 210/440, 443, 210/444, 450, DIG. 17, 435; 277/918; 220/614, 620

(56) References Cited

U.S. PATENT DOCUMENTS

| | | |
|---|---|---|
| 1,147,818 A | 7/1915 | Schidt |
| 3,588,133 A | 6/1971 | Caserta ........................ 277/235 |
| 3,606,357 A | 9/1971 | Yonkers ....................... 277/166 |
| 3,933,358 A | 1/1976 | Hoer ........................... 277/170 |
| 3,968,022 A | 7/1976 | Eng et al. ................... 204/279 |
| 4,477,345 A | 10/1984 | Szlaga, Jr. ................... 210/130 |
| 4,832,844 A | 5/1989 | Ayers .......................... 210/440 |
| 4,834,885 A | * 5/1989 | Misgen et al. ........... 210/416.4 |
| 5,301,958 A | 4/1994 | Covington ................... 277/183 |
| 5,342,519 A | 8/1994 | Friedmann et al. ......... 210/232 |
| 5,996,810 A | 12/1999 | Bounnakhom et al. ..... 210/443 |
| 6,019,229 A | * 2/2000 | Rao ............................ 210/443 |
| 6,023,834 A | * 2/2000 | Brown et al. ................. 29/509 |
| 6,059,294 A | 5/2000 | Gorce ......................... 277/630 |

* cited by examiner

Primary Examiner—Matthew O. Savage
(74) Attorney, Agent, or Firm—Woodard, Emhardt, Naughton, Moriarty and McNett

(57) ABSTRACT

A fluid filter for spin-on mounting to a base includes an outer shell defining a hollow interior and a nutplate secured to the outer shell by forming an upper edge portion of the outer shell onto the nutplate. A filtering element is positioned within the hollow interior and the base provides fluid-in and fluid-out passageways for the fluid filter. To provide a face seal against the base and concurrently a radial seal against the formed edge, a retainer and gasket assembly is used. The retainer has a base portion which rests on the nutplate and an inclined portion which extends upwardly and inwardly. An elastomeric gasket with a unique cross sectional shape has a flat portion which rests on the inclined portion. With axial compression of the gasket by the base, the gasket compresses against the retainer and expands radially into sealing contact with the formed edge.

21 Claims, 5 Drawing Sheets

SLIDING ACTION SEAM SEAL AND RETAINER ASSEMBLY FOR A FLUID FILTER

BACKGROUND OF THE INVENTION

The present invention relates in general to fluid filters and the structures and methods of sealing seams and interfaces of such filters which might be a location for possible fluid leakage. More specifically, but not exclusively, the present invention relates to spin-on filters and the structures and methods of sealing the seam interface between the nutplate and the outer shell or housing.

Attaching the shell of a filter to a nutplate can be accomplished in a number of different ways. However, rolling the shell over the outer, upright wall of the nutplate is the preferred method based on current manufacturing practices. The seam that is created by rolling the shell or by compression forming the shell around the outer wall of the nutplate is referred to as a "rolled-seam". One disadvantage of the rolled seam is that fluid tends to leak at the seam between the shell and the nutplate. One conventional method of sealing a fluid filter with a rolled-seam is to use a gasket on top of the rolled-seam between the filter and the filter head. However, a seal like this requires a groove on the filter head in order to prevent the gasket from extruding away under internal pressure.

Most of the fluid filter heads designed and used for regular spin-on filters have flat sealing surfaces without a groove. Consequently, designing a filter with a rolled seam for a conventional filter head (without a groove) requires a more creative gasket and retainer configuration. This is especially challenging when redesigning a spin-on filter with a double lock seam into a fluid filter design with a rolled seam. Double lock seams typically prevent fluid leakage from the seam so that a gasket is only used to seal the interface between the surface of filter head and the filter. When converting a fluid filter design from a double lock seam to a roll seam design, the gasket must seal the roll seam so as to prevent leakage from the seam.

In one redesign approach, a gasket at its outside diameter is supported by the inside diameter of the seam. A conventional O-ring design with a gland could be used for this application. Half of the gland could be formed by the retainer sitting on the nutplate and the other half could be created by the nutplate to seam wall. In this design, the gasket has to provide both a face seal and a radial seal concurrently. To obtain the radial seal against the seam, the inside diameter of the seam has to be controlled very tightly. Unfortunately, since the seam is obtained by forming, this inside diameter dimension cannot be controlled tightly.

Accordingly, in order to make sure that a radial seal is in fact established, the corresponding design must be predicated on an excessive interference fit between the gasket and the seam wall. This excessive interference fit in the form of compression on the gasket would ensure that there is a radial seal and that a radial seal would be established for all extremes within the tolerance ranges of the component parts. The difficulty with this approach is that the excessive interference fit makes assembling the gasket to the fluid filter during the manufacturing and assembly stages very difficult.

While important strides have been made in this field, there is still room for improvements in the areas of fluid control and installation/removal of fluid filter assemblies.

SUMMARY OF THE INVENTION

A fluid filter for spin-on attachment to a mounting base according to one embodiment of the present invention includes a nutplate, an outer shell having a formed edge secured to the nutplate, and a retainer having an inclined portion. An elastomeric gasket rests on the inclined portion, and the gasket is positioned adjacent the formed edge. Axial compression of the gasket against the retainer pushes the gasket radially outwardly into sealing contact with the formed edge of the outer shell.

A filter assembly according to another embodiment includes a mounting base having a mounting surface and a fluid filter. The fluid filter includes a nutplate threadedly secured to the mounting base, an outer shell secured to the nutplate to form a seam, and a gasket. An inclined portion is constructed and arranged to urge the gasket to radially expand to seal the seam from compression by the mounting surface.

One object of the present invention is to provide an improved retainer and gasket assembly for a fluid filter.

Related objects and advantages of the present invention will be apparent from the following description.

DESCRIPTION OF THE PREFERRED EMBODIMENTS

Figure 1:
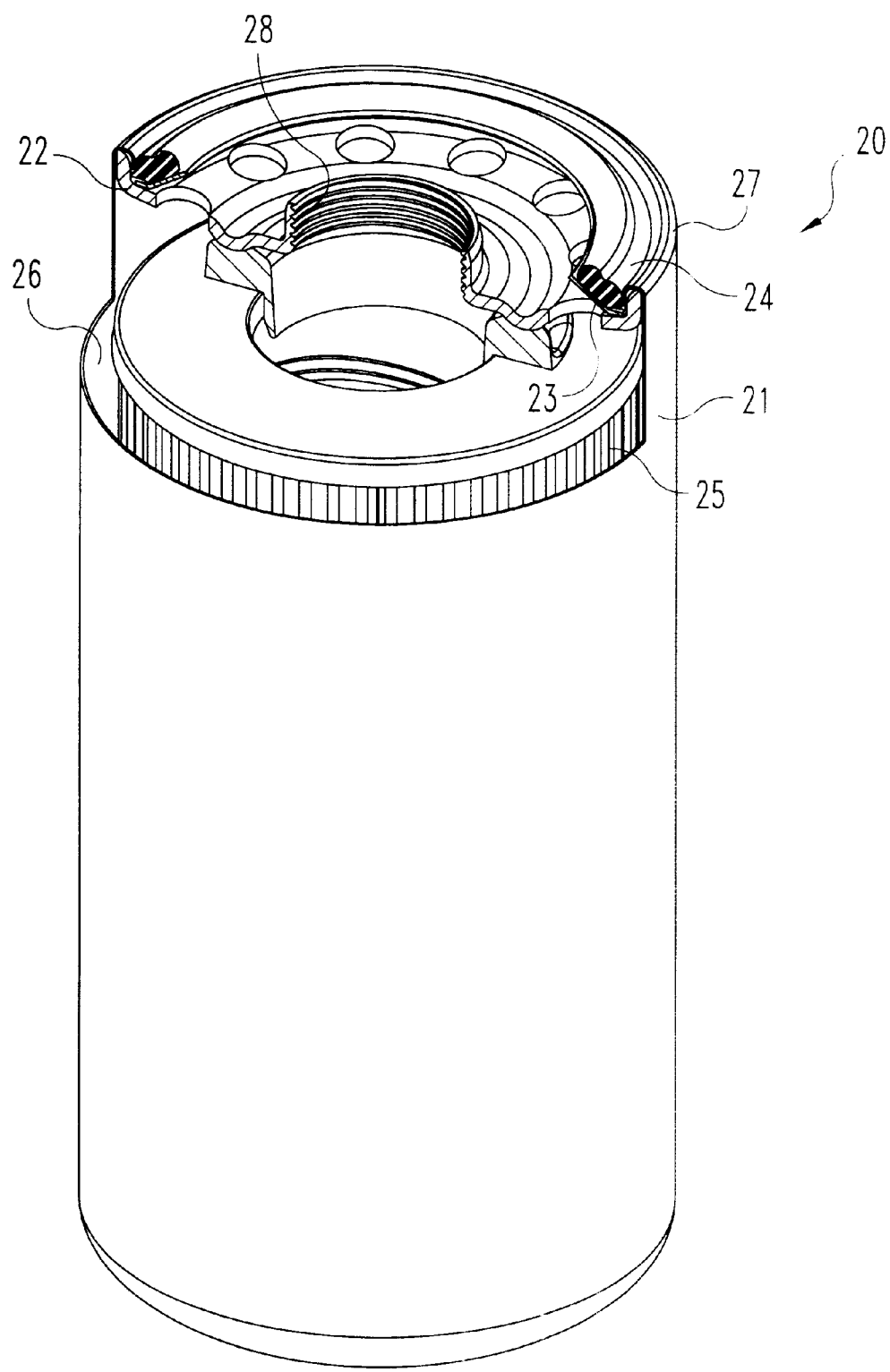
FIG. 1 is a perspective view in partial section of a fluid filter according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The design problems and difficulties with prior filter designs led to the conception of the present invention. It was envisioned that a gasket and retainer assembly which could provide both a radial seal and a face seal without requiring any initial compression on the gasket would be a significant improvement. That result has been achieved by the design of the present invention which involves a unique combination of a gasket and retainer which are assembled into a fluid filter and which concurrently establish both a face seal and a radial seal once the filter is mounted onto the filter head or mounting base.

Figure 2:
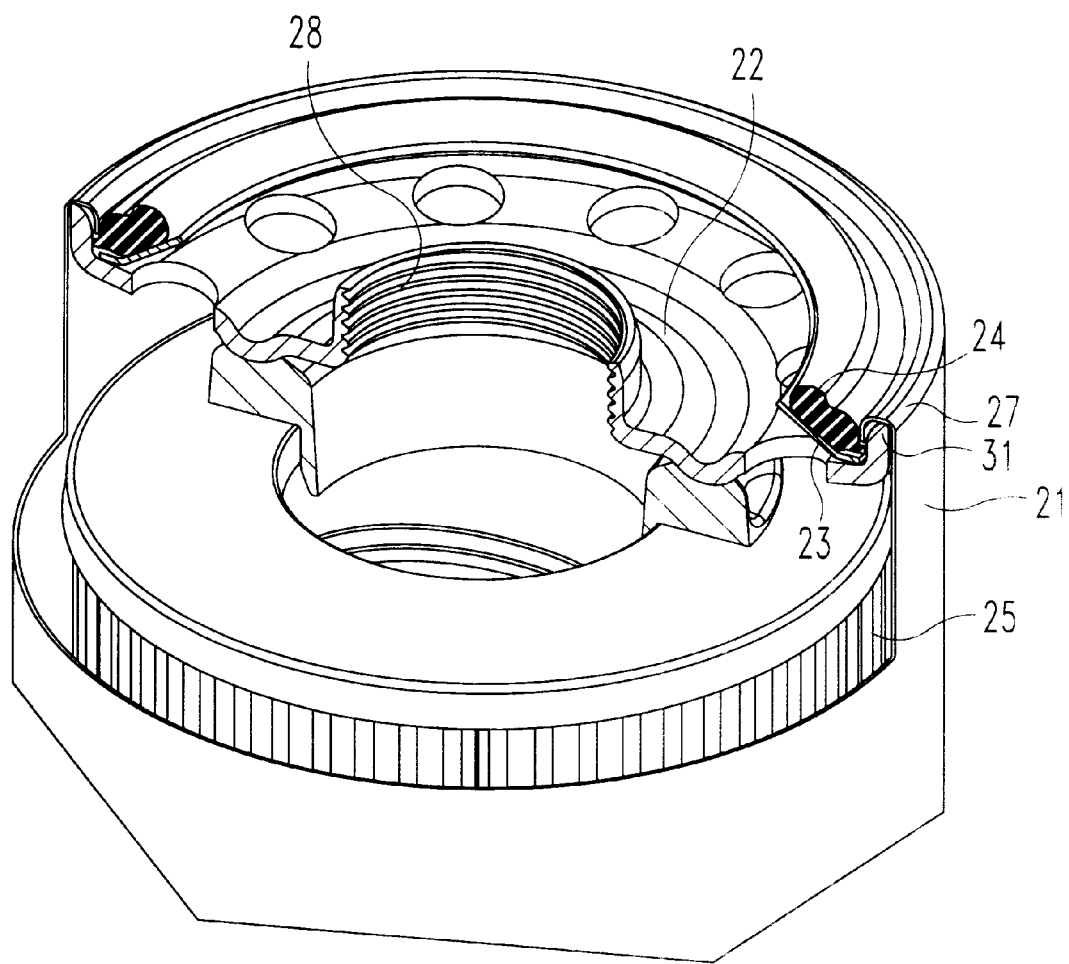
FIG. 2 is an enlarged detail of one portion of the FIG. 1 fluid filter.

Referring to FIGS. 1 and 2, a spin-on, fluid filter 20 according to the present invention is illustrated. Filter 20 includes a shell 21, nutplate 22, retainer 23, gasket 24, and filter element 25. The shell 21 defines a hollow interior 26 for receipt of the filter element 25. As shown in FIG. 2, upper end portion 27 of the shell 21 is rolled over (i.e., formed) onto the nutplate 22 so as to securely anchor the nutplate 22 to the shell 21. The nutplate 22 includes an internally threaded aperture 28 for threaded attachment of the filter 20 to a filter head or mounting base which provides fluid-in and fluid-out passageways.

The focus of the present invention is directed to seam interface 31 (see FIG. 2) between the shell 21 and the nutplate 22 and the structure used to establish a seal at the shell-nutplate interface 31 (i.e., seam). Accordingly, the intent of FIG. 1 is to represent the remainder of the fluid filter 20 and the filtering element 25 in a somewhat generic form. The important structural aspects of FIG. 1, which relate to the present invention, include the shell-to-nutplate seam 31, the fact that this is a spin-on filter using the nutplate 22 for mounting to the mounting base and the design of the mounting base for the fluid filter 20 wherein this mounting base (filter head) has a flat seal surface.

Figure 3:
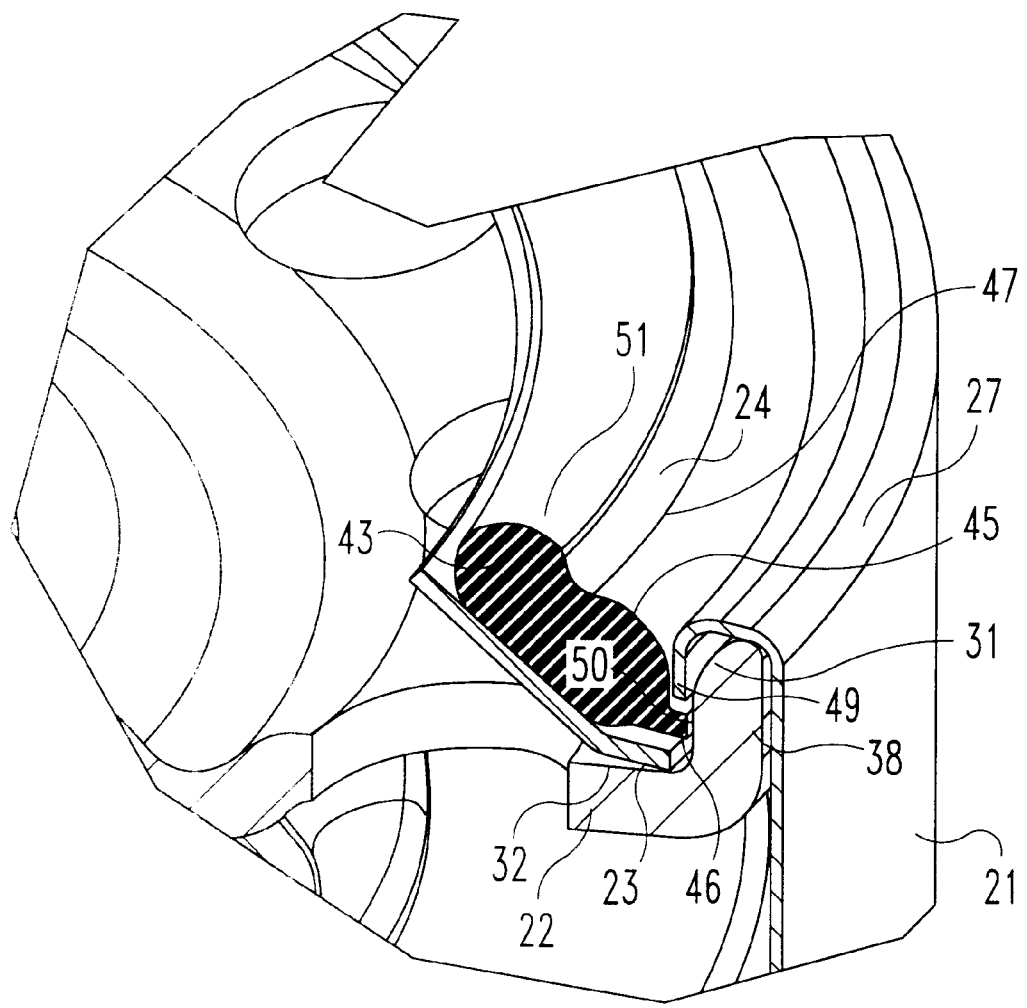
FIG. 3 is an enlarged detail of one portion of the FIG. 1 fluid filter.

The present invention is directed to the combination of the retainer 23 and gasket 24, and the relationship of this two-component combination or assembly to the shell-nutplate seam 31 and the mounting base. The arrangement of the retainer 23 and gasket 24 relative to filter 20 is illustrated in greater detail in FIG. 3 and is illustrated in an exploded-view form in FIG. 4. While these two drawing illustrations are only in partial form, it will be understood that the retainer 23 and the gasket 24 are of annular ring form, consistent with the circular or cylindrical geometry of the shell 21 and nutplate 22.

As illustrated, the retainer 23 rests on a shelf portion 32 of the nutplate 22. The gasket 24 in turn rests on the retainer 23. The functioning of the retainer 23 and gasket 24, as assembled, will be described further, once the specifics of the construction for the retainer 23 and gasket 24 are described.

The retainer 23 is a unitary, annular ring component which is formed with an inclined portion 35 which has a frustoconical shape in full form. Included as part of retainer 23 is a shelf portion or base portion 36 which is substantially flat and also in annular ring form. Although in the illustrated embodiment the retainer 23 is separate from the nutplate 22, it should be appreciated that the two components can be combined to form a unitary structure. For strength and durability, the preferred material for retainer 23 is metal. However, plastic can be used for this component. In those designs where weight is an issue or where the filter is intended to be incinerable, plastic would be the preferred material.

As would be understood, the nutplate 22 has an annular ring form, and the rolled over seam 31 created by the upper end portion 27 of the shell 21 is continuous over the full 360 degrees of the filter 20 without any breaks or discontinuities. The cross-sectional shape for the nutplate 22, as illustrated, includes an outer wall 38 which extends upwardly in a direction which is substantially parallel with the longitudinal axis of the filter 20. The shelf portion 32 is substantially horizontal when the filter 20 is oriented in an upright, vertical position. The upper surface 39 of the shelf portion 32 is substantially flat and provides a support surface for the shelf portion 36 of retainer 23. The outside diameter of retainer 23 is sized to be smaller than the inside diameter of outer wall 38. The actual dimension difference between the outside diameter of the retainer 23 and the inside diameter of the outer wall 38 can be sized so as to eliminate any tolerancing concerns and thereby enable a quick and simple drop-in assembly of the retainer 23 onto the shelf portion 32 of the nutplate 22. The shelf portion 36 of the retainer 23 resting on the upper surface 39 of the nutplate 22 ensures that the retainer 23 will be properly positioned in the filter 20.

Figure 4:
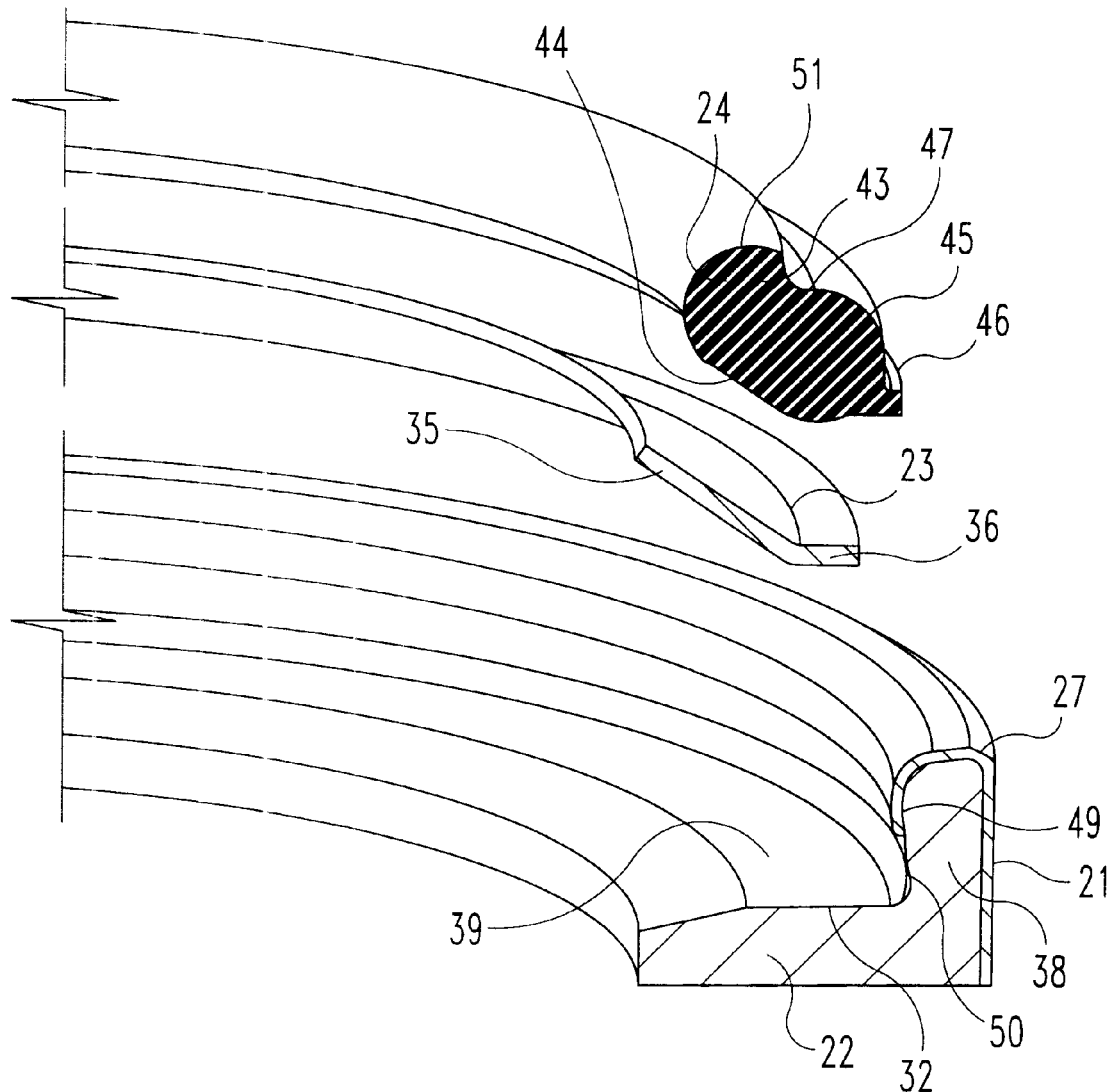
FIG. 4 is an enlarged detail, in exploded view form, of one portion of the FIG. 1 fluid filter.

Gasket 24 is a unitary, elastomeric component having an annular ring shape. The section geometry shows that the gasket 24 has a number of different portions and surfaces. These portions and surfaces are designed to cooperate with retainer 23 so as to establish a radial seal against the shell-to-nutplate seam 31 and so as to establish, concurrently, a face seal against the mounting base. The section geometry of gasket 24, as illustrated in FIG. 4, shows a face seal portion 43, a substantially flat, frustoconical surface 44, a body portion 45, and radially-extending tabs 46. In one embodiment, the gasket 24 has four (4) tabs 46 equally-spaced around the circumference of the gasket 24. In the illustrated embodiment, the gasket 24 further includes a valley portion 47 defined between the face seal portion 43 and the body portion 45. The valley portion 47 is constructed and arranged to avoid obstructions on the surface of the mounting base, such as ridges or grooves.

With regard to the assembly of gasket 24 onto retainer 23 and into nutplate 22, two important relationships are worthy of specific discussion. First, it should be noted that the shell 21 rolled over the nutplate 22 forms a lip 49. The inside diameter of the lip 49 is sized smaller than the outside diameter of gasket 24 as measured to the outside diameter of the tabs 46. An inner wall surface 50 of the nutplate 22 has an inside diameter size that provides clearance relative to the outside diameter across the tabs 46. The tabs 46 are unitary with the gasket 24 and thus are made of an elastomeric material. As such, during assembly, after the tabs 46 flex upwardly to get past nutplate lip 49, the tabs 46 flip back to their normal radial orientation. There is still ample clearance between the tabs 46 and surface 50 in order to facilitate the acceptance of relaxed tolerances. The tabs 46 will abut up against the underside surface of lip 49 to prevent any lifting of the gasket 24. This arrangement results in the tabs 46 and lip 49 actually holding the gasket 24 and the retainer 23 in position as part of filter 20. The gasket sizing and tolerancing is relaxed so that even if all tolerances go in one direction, the assembly of the gasket 24 remains a convenient and easy snap-in design, utilizing the four tabs 46 and their interference relative to lip 49. Additionally, the relaxed tolerances provided by the gap between the gasket 24 and surface 50 the gasket 24 is able to float until the gasket 24 is compressed by the filter head so that the filter 20 smoothly rotates during engagement with the filter head.

Figure 5:
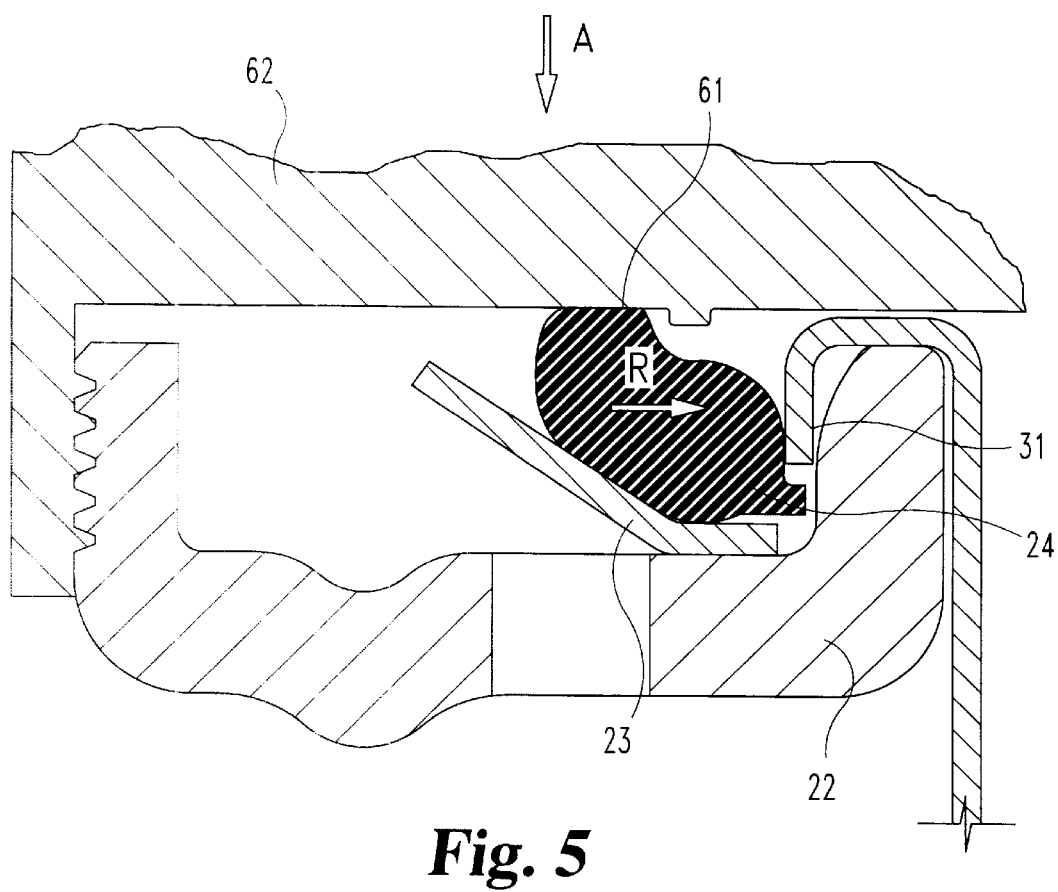
FIG. 5 is a partial, front elevational view in full section of a portion of the FIG. 1 fluid filter secured to a filter head.

The frustoconical surface 44 is constructed and arranged to rest directly onto the inclined portion 35 of retainer 23. Upper surface 51 of the face seal portion 43 is positioned directly above the frustoconical surface 44 and represents the portion which is contacted by the flat seal surface of the mounting base. FIG. 5 illustrates the orientation of the gasket 24 sealed against mounting surface 61 of mounting base (filter head) 62. Although the illustrated mounting surface 61 has an obstruction (ridge), it should be understood that one benefit of the present invention is the ability of the gasket 24 to provide a seal with relatively smooth mounting surfaces 61. As the filter 20 is threadedly assembled (spun-on) onto the mounting base 62, there is a force applied in axial direction A to the full circumference of the face seal portion 43. This axial force pushes the gasket 24 against the retainer 23. The positioning of the frustoconical surface 44 against the inclined portion 35 causes the gasket 24 to compress axially and expand outwardly in radial direction R against the shell-nutplate seam 31. The contact between the face seal portion 43 and flat seal mounting surface 61 of the mounting base 62 establishes a face seal once the filter 20 is fully seated on the mounting base 62. Concurrently, a radial seal is established by the gasket 24 pressing against the shell-nutplate seam 31. An important aspect of the present invention is that the gasket 24 spreads radially outwardly as the gasket 24 is axially compressed. This is achieved by the design of the inclined portion 35 on the retainer 23 and by the shaping of the gasket 24 cross section to include a cooperating frustoconical surface 44. The sliding action of the gasket 24, which is created between the frustoconical surface 44 and the inclined portion 35, permits an increase in the allowable tolerances for the gasket 24.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid filter, comprising:
   a nutplate having a shelf portion on an outer surface thereof, said shelf portion surrounding a central axis;
   an outer shell having a formed edge secured to said nutplate;
   a filter element received in said outer shell to filter fluid;
   a retainer resting against said shelf portion, said retainer having a frustoconical portion with a frustoconical shape that extends axially outwardly away from said shelf portion of said nutplate and in a radially inward direction towards said central axis; and
   a gasket having a frustoconical surface resting on said frustoconical portion of said retainer, said frustoconical surface of said gasket having a frustoconical shape when said gasket is uncompressed, said gasket being positioned adjacent said formed edge, wherein compression of said gasket against said frustoconical portion of said retainer pushes said gasket radially outwards into sealing contact with said formed edge of said outer shell.

2. The fluid filter of claim 1, wherein said gasket includes:
   a face seal portion positioned to seal against a mounting base;
   a body portion positioned to seal against said formed edge; and
   a valley defined in said gasket between said face seal portion and said body portion to avoid an obstruction the mounting base.

3. The fluid filter of claim 2, wherein said gasket has at least one tab extending therefrom for securing said gasket to said outer shell.

4. The fluid filter of claim 1, wherein said gasket has at least one tab extending therefrom for securing said gasket to said outer shell.

5. The fluid filter of claim 1, wherein said retainer includes a base portion resting on said nutplate.

6. The fluid filter of claim 5, wherein said nutplate includes:
   an outer wall to which said outer shell is secured; and
   wherein said base portion of said retainer rests against said shelf portion, said outer wall having an inside diameter greater than an outside diameter of said retainer.

7. The fluid filter of claim 6, wherein said retainer and said nutplate are separate components.

8. The fluid filter of claim 1, wherein said nutplate includes:
   an outer wall to which said outer shell is secured; and
   said outer wall having an inside diameter greater than an outside diameter of said retainer.

9. The fluid filter of claim 1, wherein said retainer and said nutplate are separate components.

10. The fluid filter of claim 1, wherein said retainer is of a unitary construction and has an annular shape.

11. The fluid filter of claim 1, wherein said formed edge includes a rolled-seam.

12. The fluid filter of claim 1, wherein said retainer is metallic.

13. The fluid filter of claim 1, wherein said retainer is plastic.

14. A sealing arrangement for a fluid filter, comprising:
   a nutplate defining an internally threaded aperture located on a central axis, said nutplate having a shelf portion located on an outer surface of said nutplate and surrounding said central axis;
   an outer shell secured to said nutplate to form a seam;
   a filter housed in said outer shell;
   a retainer having a base portion resting on said shelf portion and an inclined portion with a frustoconical shape, said inclined portion being positioned between said shelf portion and said internally threaded aperture, said inclined portion extending axially outwardly and radially inwardly at an oblique angle towards said central axis; and
   a gasket having a frustoconical surface resting on said inclined portion of said retainer, said frustoconical surface of said gasket having a frustoconical shape when said gasket is uncompressed that corresponds to said frustoconical shape of said inclined portion, wherein axial compression of said gasket against said retainer creates a sliding action between said frustoconical surface of said gasket and said inclined portion of said retainer to spread said gasket radially outwards and seal said seam.

15. The sealing arrangement of claim 14, wherein said gasket includes:
   a face seal portion positioned to seal against a mounting base;
   a body portion positioned to seal said seam; and
   a valley defined in said gasket between said face seal portion and said body portion to avoid an obstruction on the mounting base.

16. The sealing arrangement of claim 14, wherein said gasket has at least one tab extending therefrom that secures said gasket to said outer shell.

17. The sealing arrangement of claim 14, wherein said retainer and said nutplate are separate components.

18. An assembly, comprising:
   a mounting base having a mounting surface; and
   a fluid filter including
      a nutplate having a central axis and threadedly secured to said mounting base,
      an outer shell secured to said nutplate to form a seam, wherein said
   outer shell rolls over said nutplate to form a lip at said seam,
      a filter element positioned in said outer shell for filtering fluid,
      a gasket having a frustoconical-shaped surface when uncompressed, a retainer having an inclined portion with a frustoconical shape that is inclined towards said mounting base in a radially inward direction towards said central axis, said frustoconical-shaped surface of said gasket contacting said inclined portion of said retainer, and wherein said gasket forms a seal between said mounting base and said lip at said seam.

19. The assembly of claim 18, wherein said gasket includes:

a face seal portion sealing against said mounting surface; and a body portion sealing against said lip of said outer shell.

20. The assembly of claim 19, wherein:

said mounting surface has an obstruction that includes a ridge; and said gasket defines a valley between said face seal portion and said body portion in which said ridge is received.

21. The assembly of claim 18, wherein:

said mounting surface has an obstruction; and said gasket defines a valley in which said obstruction is received.

\* \* \* \* \*

UNITED STATES PATENT AND TRADEMARK OFFICE
CERTIFICATE OF CORRECTION

PATENT NO. : 6,571,961 B1
DATED : June 3, 2003
INVENTOR(S) : A. Caner Demirdogen It is certified that error appears in the above-identified patent and that said Letters Patent is hereby corrected as shown below:

<u>Column 5,</u>
Lines 47-48, replace "obstruction the" with -- obstruction on the --.

<u>Column 6,</u>
Lines 61-62, replace "wherein said [carriage return] outer" with -- wherein said outer --.

Signed and Sealed this

Sixteenth Day of December, 2003

JAMES E. ROGAN
*Director of the United States Patent and Trademark Office*